(12) United States Patent
Zhao et al.

(10) Patent No.: US 10,452,078 B2
(45) Date of Patent: Oct. 22, 2019

(54) SELF-LOCALIZED MOBILE SENSOR NETWORK FOR AUTONOMOUS ROBOTIC INSPECTION

(71) Applicant: General Electric Company, Schenectady, NY (US)

(72) Inventors: Yang Zhao, Niskayuna, NY (US); Mauricio Castillo-Effen, Niskayuna, NY (US); Ghulam Ali Baloch, Niskayuna, NY (US); Huan Tan, Niskayuna, NY (US); Douglas Forman, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 31 days.

(21) Appl. No.: 15/591,400

(22) Filed: May 10, 2017

(65) Prior Publication Data

US 2018/0329433 A1 Nov. 15, 2018

(51) Int. Cl.
*G01C 23/00* (2006.01)
*G05D 1/02* (2006.01)

(52) U.S. Cl.
CPC ... *G05D 1/0276* (2013.01); *G05D 2201/0207* (2013.01); *Y10S 901/44* (2013.01)

(58) Field of Classification Search
CPC ............ G05D 1/104; G05D 2201/0207; Y10S 901/44
USPC .......................................................... 701/3
See application file for complete search history.

(56) References Cited

U.S. PATENT DOCUMENTS

| 7,839,916 | B1 | 11/2010 | Luecke et al. |
| 7,962,150 | B2 | 6/2011 | Hertzog et al. |
| 8,315,794 | B1* | 11/2012 | Strelow ................. G05D 1/104 |
| | | | 701/2 |
| 8,473,118 | B2 | 6/2013 | Gottifredi et al. |
| 9,068,847 | B2 | 6/2015 | Krishnaswamy et al. |
| 9,606,219 | B2 | 3/2017 | Murdock et al. |
| 9,658,619 | B1* | 5/2017 | Bethke ................. G08G 5/0069 |
| 9,945,929 | B2 | 4/2018 | Hehn et al. |
| 2012/0024053 | A1* | 2/2012 | Cheng .................... G08B 19/02 |
| | | | 73/170.26 |

(Continued)

OTHER PUBLICATIONS

Purohit, et al. "SugarMap: Location-less Coverage for Micro-Aerial Sensing Swarms", Information Processing in Sensor Networks, Apr. 8-11, 2013, Philadelphia, PA, 10 pp.

(Continued)

*Primary Examiner* — Shardul D Patel
(74) *Attorney, Agent, or Firm* — Fletcher Yoder, P.C.

(57) ABSTRACT

Provided are systems and methods for autonomous robotic localization. In one example, the method includes receiving ranging measurements from a plurality of fixed anchor nodes that each have a fixed position and height with respect to the asset, receiving another ranging measurement from an aerial anchor node attached to an unmanned robot having a dynamically adjustable position and height different than the fixed position and height of each of the plurality of anchor nodes, and determining a location of the autonomous robot with respect to the asset based on the ranging measurements received from the fixed anchor nodes and the aerial anchor node, and autonomously moving the autonomous robot about the asset based on the determined location.

20 Claims, 6 Drawing Sheets

(56) References Cited

U.S. PATENT DOCUMENTS

| | | | |
|---|---|---|---|
| 2015/0148949 A1* | 5/2015 | Chin | G05D 1/0246 |
| | | | 700/245 |
| 2015/0225081 A1* | 8/2015 | Stabler | B64C 39/024 |
| | | | 701/3 |
| 2016/0050889 A1* | 2/2016 | Wenger | G06T 7/20 |
| | | | 348/47 |
| 2016/0193729 A1* | 7/2016 | Williams | H04B 1/0092 |
| | | | 700/258 |
| 2016/0272291 A1* | 9/2016 | Outa | B60F 3/0015 |
| 2016/0305406 A1* | 10/2016 | Zell | F03D 17/00 |
| 2017/0026807 A1 | 1/2017 | Gherardi et al. | |
| 2017/0073071 A1* | 3/2017 | Salzmann | B64D 1/22 |
| 2017/0329297 A1* | 11/2017 | Gilman | G05B 19/042 |
| 2017/0329307 A1* | 11/2017 | Castillo-Effen | G05B 19/042 |
| 2018/0255465 A1* | 9/2018 | Priest | H04W 16/18 |

OTHER PUBLICATIONS

Vydhyanathan et al., "Augmenting low-cost GPS/INS with Ultrawideband transceivers for multi-platform relative navigation", Proceedings of the 22nd International Technical Meeting of the Satellite Division of the Institute of Navigation (ION GNSS 2009), Sep. 2009, 8 pp.

Bircher, et al. "Structural Inspection Planning via Iterative Viewpoint Resampling with Application to Aerial Robotics", International Conference on Robotics and Automation, 2015, 8 pp.

Guo et al., "Ultra-wideband based cooperative relative localization algorithm and experiments for multiple unmanned aerial vehicles in GPS denied environments", International Journal of Micro Air Vehicles, 2017, 18 pp.

Minh Nguyen et al., "An Ultra-Wideband-based Multi-UAV Localization System in GPS-denied environments", 6 pp.

Guo, K., et al., "Ultra-wideband based cooperative relative localization algorithm and experiments for multiple unmanned aerial vehicles in GPS denied environments," International Journal of Micro Air Vehicles, vol. 9, Issue 3, pp. 169-186 (Mar. 28, 2017).

Ou, C., et al., "Range-Free Localization with Aerial Anchors in Wireless Sensor Networks," International Journal of Distributed Sensor Networks, vol. 2, Issue 1, pp. 1-21 (2006).

Venkatesh, S., "The Design and Modeling of Ultra-Wideband Position-Location Networks," Virginia Tech, Electrical and Computer Engineering, pp. 1-256 (Feb. 20, 2007).

Xu, Y. and Shi, X., "ABAL: Aerial Beacon Assisted Localization of Wireless Sensor Networks with RSS Maxima," Ad Hoc & Sensor Wireless Networks, vol. 29, pp. 93-112 (2015).

International Search Report and Written Opinion issued in connection with corresponding PCT Application No. PCT/US2018/031907 dated Aug. 29, 2018.

* cited by examiner

SELF-LOCALIZED MOBILE SENSOR NETWORK FOR AUTONOMOUS ROBOTIC INSPECTION

BACKGROUND

Machine and equipment assets, generally, are engineered to perform particular tasks as part of a business process. Assets are used and maintained for a variety of purposes including energy, transportation, healthcare, manufacturing, and the like. For example, assets may include distributed assets, such as a pipeline, a bridge, an electrical grid, or the like, as well as individual or discrete assets, such as a tower, a locomotive, a wind turbine, a gas flare, drilling/mining equipment, and the like. The design and implementation of these assets often takes into account both the physics of the task at hand, as well as the environment in which such assets are configured to operate.

Despite being well constructed of such materials as steel, concrete, brick, and the like, assets often deteriorate over time due to exposure to environmental conditions and other factors. Assets may experience various types of defects including spontaneous mechanical defects, electrical defects, as well as routine wear-and-tear. These defects can severely impact the operation and performance of the asset. For example, an asset may undergo corrosion or experience cracking due to weather and temperature or the asset may exhibit deteriorating performance or efficiency due to the wear or failure of certain component parts. If the damage to the asset is not repaired in a timely manner, it can lead to more serious problems and even cause the asset to break down completely.

Typically, a human inspector such as an expert or a technician of a particular type of asset may inspect, maintain, repair, and request repairs to an asset. For example, the inspector may locate corrosion on the asset and clean the corrosion therefrom, identify a part of the asset that needs replacement and order and install the replacement part, and the like. However, depending on a location of the asset, a size of the asset, and/or a complexity of the asset, human inspection of the asset can be difficult and dangerous. For example, it is difficult for a person to inspect the blades of an operating wind turbine, the tower of a gas flare, the interior of an oil platform, or the like, without risking potential injury. In addition, assets can be located in harsh environments such as underwater and at sea, in deserted areas, near high temperature systems, inside mines or tanks, and the like. Therefore, improved systems and techniques for monitoring the health of assets are needed.

SUMMARY

Embodiments described herein improve upon the prior art by providing systems and methods for performing robotic inspection of an asset via a self-localizing unmanned robot such as a drone. The unmanned robot can travel to the asset, and monitor the health of the asset by capturing image data, and the like. In various embodiments, the unmanned robot can move autonomously (i.e., without user control) without the use of GPS/DGPS. Rather, the unmanned robot can position itself on and around the asset by performing triangulation with a plurality of anchor nodes including at least one anchor node carried by a robot. That is, rather than rely on GPS latitude and longitude components which can require meters of error, the unmanned robot can be controlled to move both vertically, longitudinally, and laterally based on a group of sensor nodes that creates an accuracy within only a few centimeters of error or less. Such embodiments provide an improved ability to inspect an asset and capture data.

In an aspect of an example embodiment, provided is a robotic computing system for monitoring the health of an asset, the robotic computing system including a motor, a receiver configured to receive ranging measurements from a plurality of fixed anchor nodes that each have a fixed position and height with respect to the asset, and receive another ranging measurement from an aerial anchor node attached to an unmanned robot having a dynamically adjustable position and height different than the fixed position and height of each of the plurality of anchor nodes, and a processor configured to determine a location of the robotic computing system with respect to the asset based on the ranging measurements from the fixed anchor nodes and the aerial anchor node, and control the motor to autonomously move the robotic computing system based on the determined location.

In an aspect of another example embodiment, provided is a localization method of an autonomous robot for monitoring an asset, the localization method including receiving ranging measurements from a plurality of fixed anchor nodes that each have a fixed position and height with respect to the asset, receiving another ranging measurement from an aerial anchor node attached to an unmanned robot having a dynamically adjustable position and height different than the fixed position and height of each of the plurality of anchor nodes, and determining a location of the autonomous robot with respect to the asset based on the ranging measurements from the fixed anchor nodes and the aerial anchor node, and moving the autonomous robot based on the determined location.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings which are briefly described as follows.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a sensor network that enables an unmanned robot such as an unmanned aerial vehicle (UAV) to perform self-localization while moving autonomously around an asset. The unmanned robot may store an inspection plan for monitoring the health of the asset. The inspection plan may include a travel path as well as regions of interest at which the unmanned robot is to capture images and other data using imaging devices and sensors attached to or otherwise controlled by the unmanned robot. In order to accurately follow the travel path that is included in the inspection plan, the unmanned robot may perform self-localization based on the sensor network and control its movement based on a location determined from localization signals received from the sensor network.

Accordingly to various aspects, the sensor network includes a plurality of fixed anchor nodes, such as three fixed anchor nodes, having a fixed location and height and at least one aerial anchor node that is carried by another unmanned robot. Based on ranging measurements received from the fixed anchor nodes and the at least one aerial anchor node, the unmanned robot can estimate its location. Because the aerial anchor node is capable of changing its position, and also because the aerial anchor node can be brought significantly higher than the remaining fixed anchor nodes, the precision and accuracy of the 3D location estimation can be enhanced and the localization precision can even be optimized based on the planned travel path of the unmanned robot.

Unmanned robots such as drones, submersibles, and other robots have been increasingly used for different industrial tasks. One such task is the inspection of industrial assets, and in particular, inspection of assets that pose some kind of safety hazards for maintenance crew. Robots can reach difficult-to-access locations on or about an asset, including regions on a flare stack, a wind turbine, power lines, a power tower, within tanks, on platforms at sea, and the like. An inspection is typically performed by taking close-up pictures and videos of areas of the asset, and by collecting environmental data that can be used to detect symptoms, diagnose problems, and plan corrective maintenance procedures.

Related inspection methods with robots requires at least two people, a pilot and an inspector. The pilot operates the drone while it is near the asset and stops at certain points of interest. The inspector remotely controls the drone camera gimbal, shutter and other sensors, collecting data and taking high-resolution photos and measurements of these points of interest. The inspector also monitors a live camera view to ensure that the camera gimbal is properly aimed, pictures are correctly taken and exposed, and the sensor data is within acceptable ranges. In order to move the drone about the asset, the inspection relies on global positioning system (GPS) or differential GPS readings to guide a location of the drone in real space. However, GPS readings have a significant amount of error (e.g., five to ten meters) resulting in a difficulty in accurately placing the drone near the asset.

Typically, when the drone is docked, the inspector downloads the photos from the drone (usually via SD card or cable) and goes over the photos in a manual process. If important shots are unclear, improperly centered, or even missing, the measurements have to be re-taken, requiring the drone to be flown again to cover a subset of the points of interests. At the end of the inspection, all photos and sensor data are saved in a computer and brought back to an inspection station where a final inspection report is produced, with the detected problems described and with the picture evidence. This report may also be saved as a maintenance record and a future reference of asset condition.

These related inspection processes are often ad-hoc, with limited planning before visiting a site and flying the drone. Inspectors use their judgment and experience to guide the pilot through different points of interest on or around the asset based on current conditions and using GPS measurements. In some cases, the drone may even take one or two preliminary flights to determine a location of the asset and its parts. It might take several iterations of drone flights and photos to be taken until the photos are deemed satisfactory (i.e., clearly show the points of interests and are correctly exposed) and the location of the asset is fully understood. This is a time-consuming process, depending on the number of points of interests, weather condition and the manual skills of both pilot and inspector. This inefficiency also incurs more cost in terms of labor and resources.

According to various embodiments, provided is a sensor network system which communicates with an unmanned vehicle and which can be used by the unmanned vehicle to locate itself with respect to an asset. The sensor network system includes a plurality of fixed anchor nodes (e.g., three fixed anchor nodes) that are fixed at positions about the asset. In addition, the fixed anchor nodes may be aligned on a same plane or approximately the same plane around a location of the asset. The sensor network system also includes at least one aerial anchor node that is positioned by an unmanned robot (e.g., an aircraft, a crawling robot, a walking robot, a submersible, etc.). A location of the at least one aerial anchor node can be dynamically changes based on desired readings and accuracy levels. In some embodiments, the aerial anchor node will be significantly higher (or lower) than the plane of the fixed anchor nodes creating a smaller geometric dilution of precision (GDOP), i.e., better precision, than a situation in which all anchor nodes are at similar heights. Note that the sensor network system can perform self-localization for at least one dynamic aerial anchor node, based on pairwise ranging measurements between each two sensors, assuming the positions of at least three fixed anchor nodes are known a priori.

Each of the unmanned robots may be an unmanned aircraft vehicle (UAV) such as a drone, or other type of robot (e.g., crawler, roller, walker, autonomous underwater vehicle (AUV), etc.) The operation of the robot may have varying degrees of autonomy, between no autonomy, semi-autonomous and fully autonomous based on onboard computers and software. In order to adequately monitor the asset, the robot described herein is configured to move autonomously and without user control in lateral, longitudinal, and vertical directions based on a virtually created three-dimensional (3D) travel path by estimating its location based on the sensor network described herein. In addition, the robot may simultaneously change both lateral and vertical movements autonomously enabling automatic and highly accurate 3D movement (e.g., within centimeters) about the asset without user control. The virtually created 3D travel path and robot orientation may be virtually modeled by a user or system via a user interface and transmitted or otherwise provided to the robot. Based on the virtual 3D travel path, a processor of the robot may align the virtual 3D travel path with the real world and control movement of the robot three-dimensionally.

As mentioned, the autonomous movement may be completely autonomous or semi-autonomous. For example, in a semi-autonomous situation, a user may control the flight or movement of the robot while the robot autonomously controls a sensor attached to the robot to change orientation and field of view while capturing data/images based on the flight inspection plan that includes the 3D travel path. In another example, the movement of the robot may be completely autonomous. In this situation, no human interaction is necessary and the unmanned vehicle can take off from its base, fly, walk, roll, or swim, on its planned path, and return safely back to base on a predetermined schedule.

An inspection plan (e.g., flight inspection plan) including a travel path about an asset may be provided to the robot (or a computer system thereof) via a data link. The robot may travel to a location of the asset in the real world and align the virtually created 3D model of the travel path with a real travel path based on localization signals received from the sensor network described herein. Once the robot has arrived at a desired start location, the robot may move along the real travel path from the start location to an end location in an autonomous or semi-autonomous fashion based on the virtual 3D travel path included in the inspection plan. The start and stop locations of the travel path may be dynamically selected by a user when generating the virtual 3D travel path. Accordingly, only specific areas of interest about the asset can be monitored and evaluated dynamically instead of requiring a drone or other robot to monitor the asset from top to bottom.

While executing the travel path, the robot may stop, pause, slow down, speed-up, maintain speed, etc., and capture images as well as sense for other data (e.g., temperature, humidity, pressure, etc.) at various regions of interest (ROI) designated by the inspection plan and based on its self-determined location from the sensor network. For each ROI, the inspection plan may include three-dimensional coordinates (e.g., X, Y, and Z axis coordinates) at which the robot is to be located for performing inspection. In addition to a location in three dimensional space, each ROI may include a perspective with respect to a surface of the asset at which the robot should capture data images, field of view of a camera, orientation, rotation of the robot, and the like.

The robotic system may be used to monitor, repair and maintain an asset. As discussed herein, assets may be generally discrete or limited in their extent (e.g., a transportation vehicle such as an aircraft, locomotive, subway, helicopter, ship, submersible, space launch vehicle, satellite, and so forth) or may be geographically distributed (e.g., a road or rail track, a port or airport, a pipeline, electrical infrastructure, a power generation facility, manufacturing plant, wind farm, bridge, platform, and so forth). The present approach as described herein may be used to monitor (e.g., visually inspect) and maintain assets in an autonomous or semi-autonomous manner using robotic intermediaries such as unmanned drones or other robots. As discussed herein, the robotic intermediaries may be used to facilitate one or both of health monitoring of the asset and repair, remediation, or improvement of the asset with limited or no human support.

Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, the health of the asset depends on identifying and addressing such defects in a timely and effective manner. In some embodiments, an asset model stored by the robot may capture the historical development of deterioration of the asset as well as changes in the surrounding environment, for example. During travel path generation, an inspector may be interested in comparing pictures of a specific ROI at different times. Those comparisons may be computer-aided, for example to measure growth of corrosion.

The example embodiments provide a robot system that may be used to monitor and manage the health of an asset that reduces or eliminates human intervention. A robot may be a machine (e.g., electro-mechanical) capable of carrying out a set of tasks (e.g., movement of all or part of the robot, operation of one or more type of sensors to acquire sensed data or measurements, and so forth) automatically (e.g., at least partially without input, oversight, or control by a user), such as a set of tasks programmed by a computer. For example, the robot may include one or more sensors to detect one or more characteristics of an asset and one or more effectors to perform an operation based on a 3D virtual inspection plan to assess, repair, and/or service the asset. The robot may include a processing system that includes one or more processors operatively coupled to memory and storage components. The robot may also include effectors capable of performing monitoring and maintenance of an asset under the control the processing system.

Figure 1:
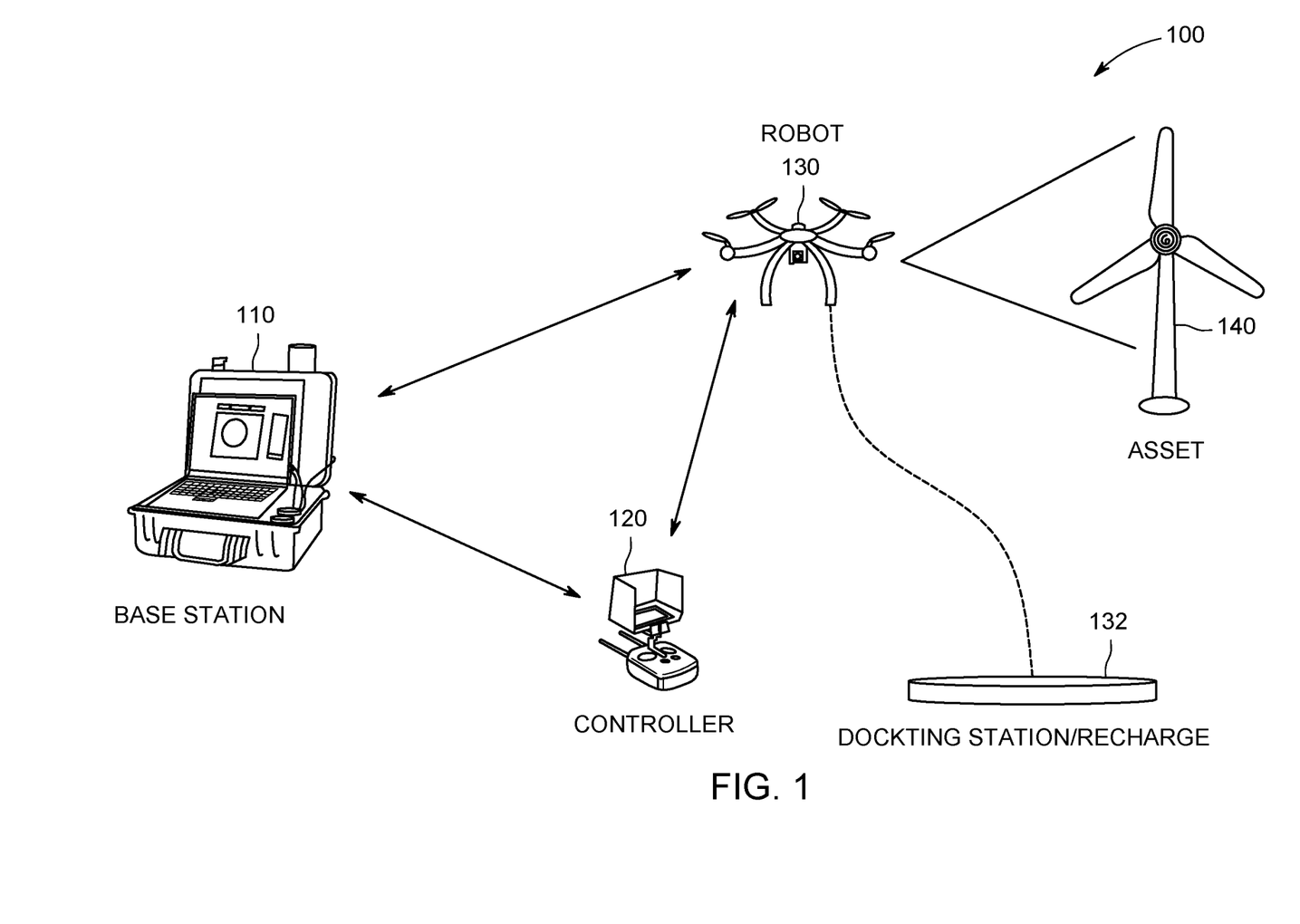
FIG. 1 is a diagram illustrating a robotic inspection system in accordance with an example embodiment.

FIG. 1 illustrates a robotic inspection system 100 in accordance with an example embodiment. Referring to FIG. 1, the robotic inspection system 100 includes an unmanned robot 130 that inspects an asset 140. For example, the unmanned robot 130 may include an unmanned aerial vehicle (UAV) such as a drone, a crawling robot, a rolling robot, a walking robot, a submersible, and the like. In the example of FIG. 1, the unmanned robot 130 includes a docking station 132 for recharging and storage. Also, the unmanned robot 130 may communicate with a controller 120 and a base station 110. For example, the controller 120 and the base station 110 may receive data from and transmit data to the unmanned robot 130 via a data communication channel. Also, in some examples the base station 110 may receive input from a user (e.g., an engineer) sending commands to the unmanned robot 130 via the data communication channel. The communication channel may be wireless, for example, satellite, cellular, local, and/or the like, and/or it may be wired in some instances.

The asset 140 may be a structure that is disposed at a geographical location accessible by the unmanned robot 130. For example, the asset 140 may be an oil platform disposed at sea, a tank or well that is disposed under the earth's surface, a pipeline disposed along the earth's surface, a bridge, a gas flare, a turbine, and the like. Based on an inspection plan, the unmanned robot 130 may autonomously move about and around the asset 140 while inspecting (e.g., collecting data) from the asset 140. In the example of FIG. 1, the unmanned robot 130 is a drone that can fly about the asset 140. The drone can land on locations on a surface of the asset 140, pause in mid-air, and the like. In some examples, the inspection plan may include a 3D virtual model of a travel path and the drone 130 may fly about a travel path around the asset 140 based on a 3D model of a virtual travel path included in a flight inspection plan. In some cases, the drone 130 may also receive instructions providing a travel path from the docking station 132 to a starting point of the flight inspection plan.

According to various embodiments, the unmanned robot 130 may perform an inspection of a plurality of regions of interest of the asset 140 based on the inspection plan that is received from the base station 110, the controller 120, or input locally through the unmanned robot 130. The regions of interest may be positioned at various distributed locations throughout the asset 140, clustered within a predefined area of the asset 140, and/or the like. Each region of interest may include a position to be inspected on the asset, an orientation at which the camera (or other sensor) should be positioned with respect to a surface of the asset at the region of interest, a rotation about the asset that the drone should travel while capturing sensor data, a field of view, and the like.

Figure 2:
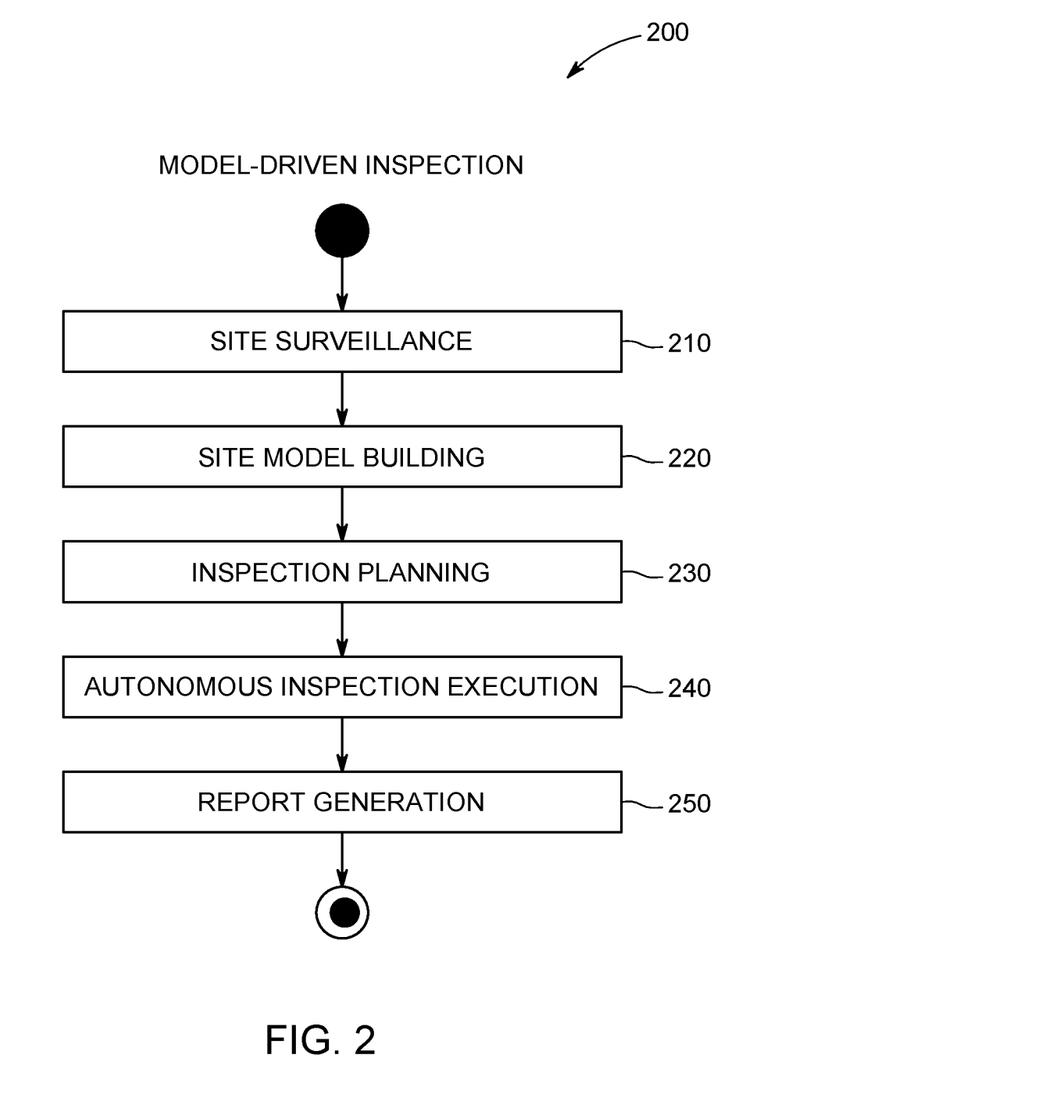
FIG. 2 is a diagram illustrating a model-driven asset inspection process in accordance with an example embodiment.

FIG. 2 illustrates an end-to-end robotic inspection process 200 that may be performed for monitoring the health of an asset in accordance with an example embodiment. The process 200 may be performed by the system shown in FIG. 1, or another device or plurality of devices. Referring to FIG. 2, in 210, site information and/or detailed asset 3D models may be collected from a site through a surveillance and planning stage. For example, the site information may be obtained by a robot that includes a depth sensor and cameras (e.g., RGB, infrared, etc.) mounted thereon (e.g., a UAV, drone, etc.) which can be a different robot than the inspection robot performing the inspection process or it may be the same robot. As another example, the site information may be gathered from historic data and/or models in virtual space.

In 220, a site model which may include an asset model and additional information about a site at which the asset is located is designed, for example, based on at least one of the surveilled information and historical information of the asset and its parts. The site model may include a 3D virtual model that is a digital replica (i.e., digital twin) of a corresponding real (i.e., physical) asset. In some examples, the asset model may contain additional semantic information (also referred to as labels) identifying specific assembly components within the asset, history of maintenance and repair actions of each component, and other information that may be used to update, maintain, or generate new inspection plans for the asset or similar types of assets. Aside from component labels, semantic information may also include features and characteristics such as anomalies (e.g., cracks, corrosion, etc.) that may have been identified during the initial process of building the 3D model or afterwards. Semantic information may be generated manually, but also via automated techniques such as software leveraging computer vision and machine learning techniques.

In order to generate the inspection plan, a user interface may be provided and may be interacted with via a user device such as the base station, a tablet, or other computer, allowing a user such as an inspector to identify regions of interest with respect to the virtual asset. For example, the user may specify one or more regions of interest on a virtual asset's 3D model and/or within the site model, indicating features such as each point's location, field of view, how many shots and sensor measurements should be taken, orientation, and the like. According to various embodiments, the user annotated site model of the virtual asset may be used to auto-generate a highly accurate virtual 3D robot travel path (e.g., drone flight inspection plan) in 230. For example, the application described herein may generate a virtual 3D travel path about the asset in virtual space to be used by the robot during the inspection process.

Way points in real space correspond to regions of interests on the virtual space, and are points at which data and photos are to be captured by the robot. For example, in addition to video and still images, the data to be captured may include thermal images, ultraviolet images, sniffing for chemical concentrations, and the like, of various asset parts, asset sub-regions, and the like. The route planning can be done in multiple passes, for example, using RGB camera and IR camera separately. In addition, the inspection plan can be adjusted on the inspection site to focus on certain points of interest. For example, an IR camera pass may detect hot spots that are set for further inspection using the RGB camera.

Referring again to FIG. 2, in 240, an autonomous or semi-autonomous inspection of the asset is performed by the unmanned robot (e.g., submersible, drone, crawler, roller, walker, etc.) based on the virtually created 3D travel path. In the example of a UAV, high-accuracy GPS systems and autopilot controllers allow the UAV to execute a complex and precise flight plan around assets based on the virtual 3D travel path included in the flight plan. The UAV may follow a pre-defined GPS guided route based on the site information, detailed asset 3D model and points of interests. The route guidance may be achieved by an embedded computing unit on the drone that controls the drone flight and/or highly accurate GPS antennas that can pinpoint the drone location within centimeters of accuracy. Also, other information instead of GPS may be used for localization of the robot such as known localization techniques in GPS denied areas.

In addition, cameras and other sensors attached to the drone may also be controlled by the same embedded computing unit and synced with flight route to capture data exactly at point of interests (specified by experts during planning stage). In 250, a report may be generated by the robot or by the base station based on the data captured by the robot. The report may include identification of areas on the asset that need repair, replacement, maintenance, and the like, as well as health and status details about the asset based on the captured data. For example, one or more predictive analytics may be performed based on the captured data and added to the report.

In some examples, inspectors may supervise the overall operation of the unmanned robot performing the process inspection process 240 via a mobile application that monitors each part of the inspection process including sensor data and pictures, drone location, position with respect to the asset, and the like. Also, image quality analysis algorithms may automatically flag potential low quality pictures (e.g., unclear photos, point of interest too small or not within center of the frame, etc.), assisting the user to detect bad photos during the flight. Reduced quality copies of pictures taken by the drone may be sent to the mobile application where a user can then quickly verify the quality and accuracy of each picture. Images may also be geotagged and associated to their correspondent position in the flight plan and asset model. In addition, the robot can be instructed to re-run certain travel/flight paths and re-take a subset of the points of interest, during flight, if necessary, correcting potential errors on the spot. The resulting system allows for a single-user inspection (as opposed to multi-user inspection which has been traditionally required. The embodiments also provide the robot with control to start, stop, pause, and resume the movement/flight due to model-driven auto pilot.

The system provided herein also supports multiple-drone operation in multi configurations, optimizing inspection procedure. In a serial drone deployment, one drone may be deployed at a time, minimizing battery exchange down time. In a serial drone operation for multi-pass inspection, a first drone may perform a scan pass using an infra-red camera, following a model path, detecting hot spots and leaks and a second drone may perform a high-resolution image capture of hot spots detected by first drone. As another example, in parallel deployment, multiple drones may be deployed at a time, on a divide and conquer strategy, having each drone inspect a sub-area of the asset in parallel. In this example, route planning of multiple drones may be performed to avoid mid-air collision and distribute the points of interest to balance the load of each drone. As another example, the system may use a collaborative teams of robots. For example a drone may be used to deploy a crawler at a specific spot on the asset. In this example, drones and crawlers may communicate with each other to provide complementary sensory capabilities for inspection. As another example, a drone may be used for inspection, and a crawler may be used for maintenance and repair.

According to various aspects, the process 200 may reduce inspection time of a robot and cost due to improved data quality and accuracy (reduced inspection errors), reduced crew operations (e.g., one user instead of two or more), reduced flight time (optimal route planning, reduce time to take the same points of interest multiple time, less down time to change battery, detection of photo quality during the flight, etc.), and improved safety to the overall inspection process.

Related localization systems for unmanned aerial vehicles (UAVs) typically use GPS. The example embodiments provide a localization method that does not require GPS, is more accurate than GPS, and may be used at GPS denied environments. Some of the motivation behind the system described herein is that Lidar based localization systems often consume too much power and are not light-weight. As another example, received signal strength (RSS)-based systems suffer from multipath effect and cannot provide decimeter level accuracy. As another example, vision based systems such as Vicon are sensitive to lighting and environment change, and hard to deploy and calibrate.

Figure 4:
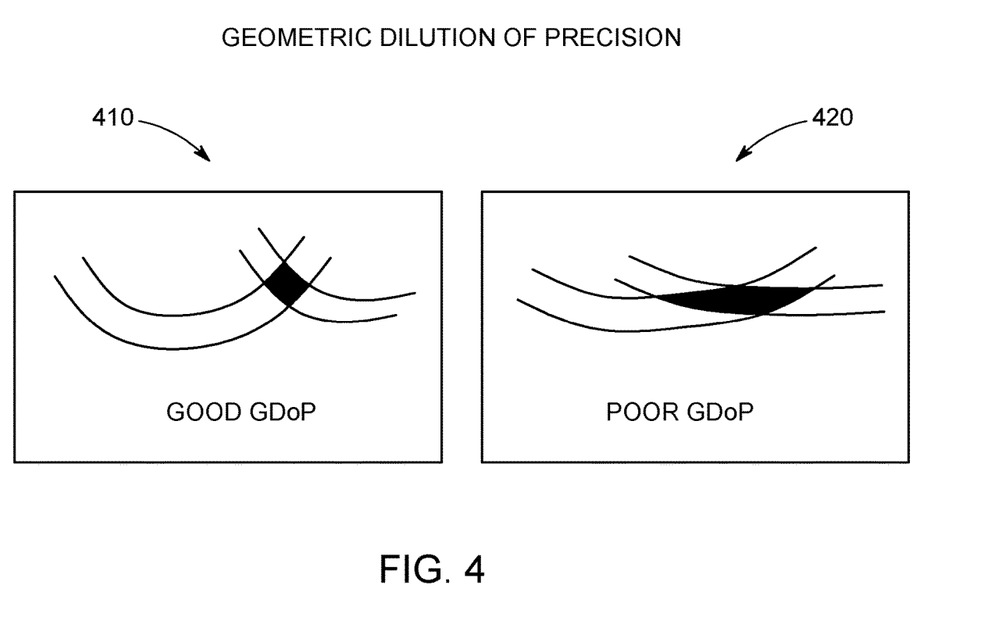
FIG. 4 is a diagram illustrating a comparison of a geometric dilution of precision in accordance with an example embodiment.

Ultra-wide band (UWB) provides a low-power localization solution, but it has some drawbacks including that height (Z) positioning estimates suffer from a lack of geometric dilution of precision (GDOP) of anchor nodes (see 420 in FIG. 4). In addition, the performance of UWB often suffers from lack of line-of-sight between anchor nodes and UWB tags attached to UAVs. Furthermore, for practical field inspection using UAVs, it is often difficult to instrument the environment by deploying a large number of well-measured and calibrated anchor nodes. Accordingly, provided is a fast and accurate anchor node deployment method for a localization system that only requires a minimum of three fixed anchor nodes and one aerial anchor node. The system design reduces the need for many anchor nodes while also significantly improving precision and accuracy in comparison to conventional GPS navigation systems.

Figure 3:
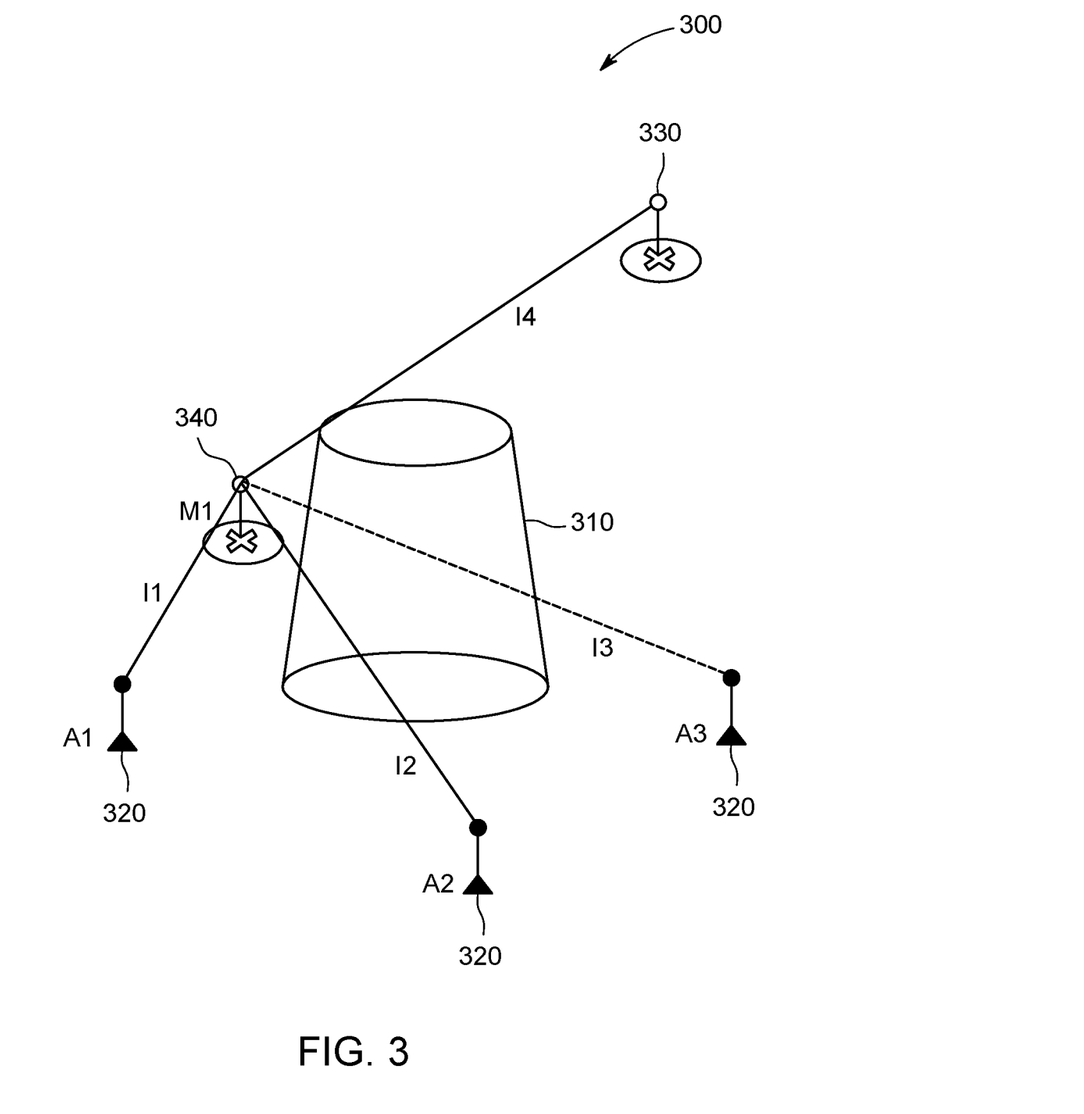
FIG. 3 is a diagram illustrating a self-localizing robotic inspection system in accordance with an example embodiment.

FIG. 3 illustrates a self-localizing robotic inspection system 300 in accordance with an example embodiment. Referring to FIG. 3, the system 300 includes an unmanned robot 340 (also referred to as $M_1$) for performing an inspection of an asset 310. The unmanned robot 340 in this example is an unmanned aerial vehicle UAV such as a drone. According to various aspects, the unmanned robot 340 may determine its location using a plurality of fixed anchor nodes 320 and at least one aerial anchor node 330. The unmanned robot 340 may receive time of flight (TOF) signals from each of the fixed anchor nodes 320 and the aerial anchor node 330 and determine its location with respect to the asset 310 based on the time of flight signals. In addition, the unmanned robot 340 may store a travel path which may include a travel path that the unmanned robot 340 is to travel while inspecting the asset 310. Based on the TOF signals received from the fixed anchor nodes 320 and the aerial anchor node 330, the unmanned robot 340 may determine its location and compare its location to the stored travel path to determine where it should move. The unmanned robot may perform autonomous movement, semi-autonomous movement, or be controlled manually by one or more inspectors remotely.

In the example of FIG. 3, the system 300 is a localization system with self-localization capability. The fixed anchor nodes 320 are deployed at fixed locations having a fixed height which may be the same or similar as each other. In addition, the aerial anchor node 330 can fly into the sky and hold its position at a desired height above the fixed anchor nodes 320 thereby improving the geometric dilution of precision as shown in 410 of FIG. 4. Here, the unmanned robot 340 may include a UWB tag attached thereto that can measure the TOF distances between itself and four UWB anchor nodes $A_1$-$A_4$ (i.e., three fixed anchor nodes 320 $A_1$-$A_3$ and one aerial anchor node 330 $A_4$). For a trilateration localization system, fixed anchor nodes $A_1$-$A_3$ can be placed on the same plane such as on three tripods with the same height on the ground, and aerial anchor node 330 $A_4$ can be placed on a UAV at a desired height. The self-localization capability of this mobile sensor network comes from the fact that all four anchor nodes can measure the TOF distances among themselves, in addition to the TOF distances via links to the tag ($l_1$-$l_4$).

In this example, some of the anchor-to-tag links are line-of-sight (LOS), some are non-LOS (NLOS). The anchor nodes on the mobile UAVs can adjust their positions to maximize the number of LOS links based on different geometries of other anchor nodes at fixed locations. To determine the locations of the anchor nodes, GDOP used in the GPS navigation may be applied. As shown in FIG. 4, in GDOP 410 generated by the system 300 and GDOP 420 generated by a related system, the measurement errors from two anchor nodes remain the same. However, the overlap area (with true location estimates inside) of the GDOP 410 (of the system 300) is much smaller than the related GDOP 420. That is, the localization precision of the GDOP 410 according to the system shown in FIG. 3 provides a much better GDOP such as shown in the left GDOP 410 in comparison to the related art GDOP in 420 of FIG. 4.

As an example, the GDOP can be calculated using the close-form formulation: GDOP=sqrt(trace(GT*G)−1), where matrix G is given by:

$$G = \begin{pmatrix} e_{11} & e_{12} & e_{13} & 1 \\ e_{21} & e_{22} & e_{23} & 1 \\ e_{31} & e_{32} & e_{33} & 1 \\ e_{41} & e_{42} & e_{43} & 1 \end{pmatrix},$$

where ei1, ei2, ei3 (i=1, . . . 4) denote the X, Y, and Z direction vectors from the unmanned robot 340 to the four anchor nodes 320 and 330.

In this example, the anchor node locations and the possible UAV locations are known, and the direction vectors and then the GDOP can be calculated as a result. According to various embodiments, an optimized anchor node deployment plan can be designed for aerial anchor node 330 by minimizing the GDOP using a pre-defined UAV flight/travel path (for example from the motion planning) for the unmanned robot 340. The self-localization capability comes from the automatic optimized aerial anchor node deployment method and provides a better GDOP for the aerial anchor node. Take for example the four-anchor node system shown in FIG. 3. If the X, Y, and Z locations of the three fixed anchor nodes 320 at fixed locations on the ground are known, the optimal location $p=[p_x, p_y, p_z]^T$ of the mobile aerial anchor node 330 may be calculated by solving the problem as:

$$p = \underset{m \in M}{\arg\min}\, GDOP(m)$$

where $m=[m_x, m_y, m_z]^T$ represents the X, Y, and Z coordinates of the mobile aerial anchor node, and M represent all possible locations that the aerial anchor node can reach within an inspection area. M can be obtained from inspection and motion planning.

For anchor nodes on multiple UAVs, a search space for each UAV can be defined and it only requires extending the same optimization problem as above to multiple UAVs. Once a deployment plan for all anchor nodes is determined, it is possible to follow the plan to set up the anchor nodes on fixed locations and then program the UAVs carrying mobile anchor nodes so that they can follow a flight plan to predefined locations. After all anchor nodes are at stationary locations, distance measurements between anchor nodes and the inspection UAV can be used as range measurement input to perform localization for the inspection UAV.

Figure 5:
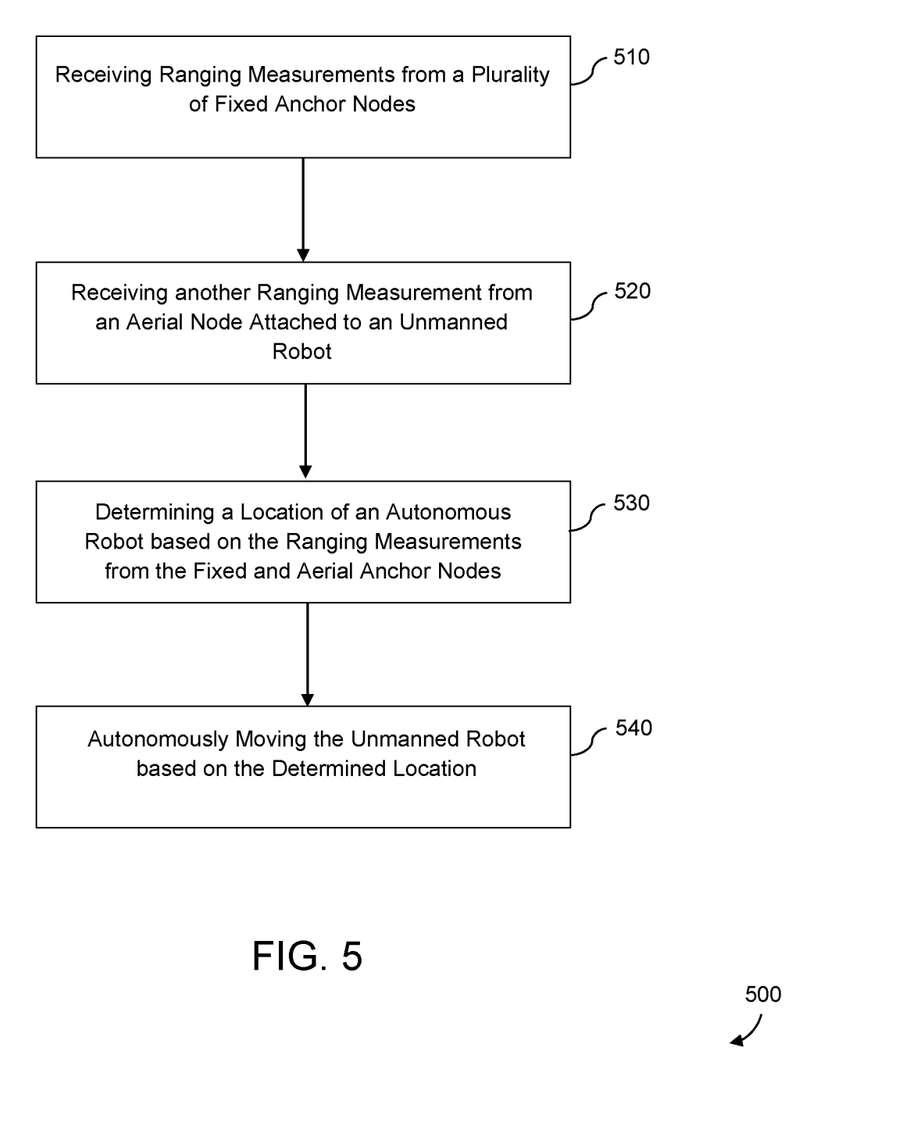
FIG. 5 is a diagram illustrating a localization method of an autonomous robot in accordance with an example embodiment.

FIG. 5 illustrates a localization method 500 of an autonomous robot in accordance with an example embodiment. For example, the localization method 500 may be performed by an autonomous unmanned robot such as a drone, submersible, or some other robot. Referring to FIG. 5, in 510, the method includes receiving fixed range measurement signals from a plurality of fixed anchor nodes that each have a fixed position and height with respect to the asset. The range measurement may include time of flight signals enabling the unmanned robot to determine a distance between itself and each of the respective fixed anchor nodes. As an example, the sensor network may include three fixed anchor nodes arranged in a predetermined pattern at different positions about an asset. In some embodiments, the plurality of fixed anchor nodes may be disposed on the same plane (e.g., have a same height as one another).

In 520, the method further includes receiving a range measurement signal from an aerial anchor node attached to an unmanned robot. The unmanned robot may be capable of moving itself and have a dynamically adjustable position and height. Here, the autonomous robot performing self-localization may be a first unmanned autonomous vehicle and the unmanned robot providing the dynamic localization signal may be a second unmanned vehicle which can be autonomous. In some embodiments, the position and height of the aerial anchor node is different than the fixed position and fixed height of each of the plurality of anchor nodes. For example, the aerial anchor node may be significantly higher in height than the three fixed anchor nodes having a similar plane. In some embodiments, the range measurements from the fixed anchor nodes and the aerial anchor node includes ultra-wide band (UWB) signals. In some embodiments, at least one additional aerial anchor node attached to at least one other unmanned robot may be included within the sensor network and may provide an additional range measurement. In this example, the location of the autonomous inspection unmanned robot may be further determined based on the additional range measurement from the autonomous robot carrying aerial anchor node.

In 530, the method includes determining a location of the autonomous robot with respect to the asset based on the localization signal. For example, based on the time of flight signals from the fixed anchor nodes and the aerial anchor node, and one or more triangulation methods, the autonomous robot may determine its location. In addition, the location of the aerial anchor node may be determined based on a GDOP calculated from the locations of the fixed anchor nodes and the planned travel path of the robotic computing system. In 540, the method further includes moving the autonomous robot about the asset based on its determined location. In some embodiments, the method may further include transmitting a request to adjust at least one of the height and the position of the unmanned robot based on a line-of-sight between the autonomous robot and the aerial anchor node. In some embodiments, the method may further include receiving a second localization signal from the aerial anchor node after the at least one of the height and the position of the unmanned robot have been adjusted, and determining the location of the autonomous robot based thereon.

Figure 6:
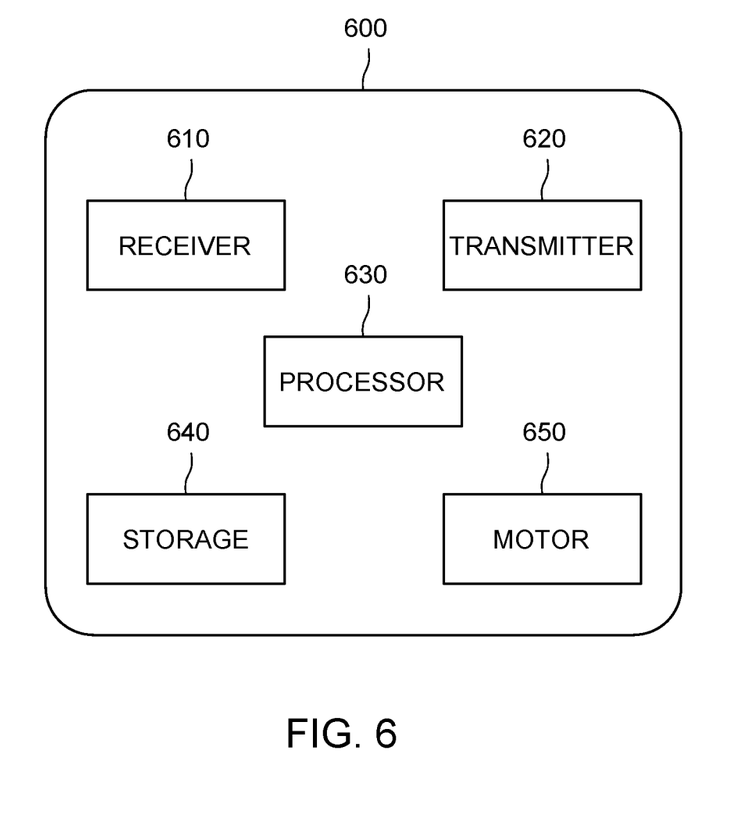
FIG. 6 is a diagram illustrating a robotic inspection computing system in accordance with an example embodiment.

FIG. 6 illustrates a self-locating robotic computing system 600 in accordance with an example embodiment. For example, the computing system 600 may be a robot capable of autonomously moving and locating itself based on time of flight signals provided from anchor nodes included in a sensor network. Also, the computing system 600 may perform the method 500 of FIG. 5. Referring to FIG. 6, the computing system 600 includes a receiver 610, a transmitter 620, a processor 630, a storage 640, and a motor 650. Although not shown in FIG. 6, the computing system 600 may include other components such as a display, an input unit, a data communication interface, an output unit, and the like. The receiver 610 and the transmitter 620 may receive and transmit signals such as RF signals, data signals, cellular signals, satellite signals, and the like.

The processor 630 may include one or more processing devices each including one or more processing cores. In some examples, the processor 630 is a multicore processor or a plurality of multicore processors. Also, the processor 630 may be fixed or it may be reconfigurable. The storage 640 may store an inspection plan including a travel path for the robot and regions of interest of an asset that are to be inspect. The storage 640 may also store data captured while the computing system 600 performs the inspection process. The storage device 640 is not limited to any particular storage device and may include any known memory device such as RAM, ROM, hard disk, and the like. The motor 650 may be a plurality of motors and may be configured to move the robot autonomously based on control signals from the processor 630.

According to various aspects, the receiver 610 may receive localization signals from anchor nodes included in a sensor network. For example, the receiver 610 may receive ranging measurements (also referred to as fixed localization signals) from a plurality of fixed anchor nodes that each have a fixed position and height with respect to the asset. Here, the number of fixed anchor nodes may be two, three, or more anchor nodes. In addition, the receiver 610 may receive another ranging measurement (e.g., another localization signal) from an aerial anchor node attached to an unmanned robot (such as a drone) having a dynamically adjustable position and height different than the fixed position and height of each of the plurality of anchor nodes. The processor 630 may determine a location of the robotic computing system 600 with respect to the asset based on the ranging measurements received from the fixed anchor nodes and the aerial anchor node, and control the motor 650 to autonomously move the robotic computing system 600 about the asset based on the determined location.

In some embodiments, the transmitter 620 may transmit a request to adjust at least one of the height and the position of the unmanned robot holding the aerial anchor node based on a line-of-sight between a node on the autonomous robot and the aerial anchor node. In this example, the receiver 610 may receive another a second ranging measurement from the aerial anchor node after the at least one of the height and the position of the unmanned robot have been adjusted, and the processor 630 may determine the location of the robotic computing system based thereon. By moving the aerial anchor node, a geometric dilution of precision can be improved. In addition, a line of sight can be improved thus reducing the need for extra fixed anchor nodes.

Although the examples herein are provided, for the most part, with respect to assets on land it should be appreciated that the embodiments may be incorporated with submersible drones for inspecting underwater assets. In this situation, the virtual created 3D travel path would be created in the same way but instead of a travel path being through the air it would be through water or some other liquid based environment such as oil, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A robotic computing system for monitoring a health of an asset, the robotic computing system comprising:
   a motor;
   a receiver configured to receive ranging measurements from a plurality of fixed anchor nodes that each have a fixed position and a fixed height with respect to the asset, and to receive an additional ranging measurement from an aerial anchor node attached to an unmanned robot having a dynamically adjustable position and a dynamically adjustable height different than the fixed position and the fixed height of each of the plurality of fixed anchor nodes; and
   a processor configured to determine a location of the robotic computing system with respect to the asset based on the ranging measurements received from the plurality of fixed anchor nodes and the additional ranging measurement received from the aerial anchor node, and to control the motor to autonomously move the robotic computing system about the asset based on the location of the robotic computing system.

2. The robotic computing system of claim 1, wherein the plurality of fixed anchor nodes comprises three anchor nodes, wherein each of the three anchor nodes is positioned at a different fixed position around the asset.

3. The robotic computing system of claim 1, wherein the plurality of fixed anchor nodes is disposed on a same plane, and the aerial anchor node is disposed at a predetermined height above or below the same plane.

4. The robotic computing system of claim 1, further comprising a transmitter configured to transmit a request to adjust at least one of the dynamically adjustable height and the dynamically adjustable position of the unmanned robot based on a line-of-sight between the robotic computing system and the aerial anchor node.

5. The robotic computing system of claim 4, wherein the receiver is further configured to receive an updated ranging measurement from the aerial anchor node after at least one of the dynamically adjustable height and the dynamically adjustable position of the unmanned robot have been adjusted, and wherein the processor is configured to determine the location of the robotic computing system based thereon.

6. The robotic computing system of claim 1, wherein the processor is configured to determine a location of the aerial anchor node based on a geometric dilution of precision (GDOP) calculated from respective locations of the plurality of fixed anchor nodes and a planned travel path of the robotic computing system.

7. The robotic computing system of claim 1, wherein the ranging measurements comprise ultra-wide band (UWB) signals.

8. The robotic computing system of claim 1, wherein the robotic computing system comprises a first unmanned autonomous vehicle and the unmanned robot comprises a second unmanned autonomous vehicle.

9. The robotic computing system of claim 1, wherein the receiver is further configured to receive a second additional ranging measurement from a second aerial anchor node attached to a second unmanned robot having a dynamically adjustable position and a dynamically adjustable height, and wherein the location of the robotic computing system is further determined based on the second additional ranging measurement received from the second aerial anchor node.

10. A localization method of an autonomous robot for monitoring an asset, the localization method comprising:
receiving ranging measurements from a plurality of fixed anchor nodes that each have a fixed position and a fixed height with respect to the asset;
receiving an additional ranging measurement from an aerial anchor node attached to an unmanned robot having a dynamically adjustable position and a dynamically adjustable height different than the fixed position and the fixed height of each of the plurality of fixed anchor nodes; and
determining a location of the autonomous robot with respect to the asset based on the ranging measurements received from the plurality of fixed anchor nodes and the additional ranging measurement received from the aerial anchor node, and moving the autonomous robot about the asset based on the location of the autonomous robot.

11. The localization method of claim 10, wherein the plurality of fixed anchor nodes comprises three anchor nodes, wherein each of the three anchor nodes is positioned at a different fixed position around the asset.

12. The localization method of claim 10, wherein the plurality of fixed anchor nodes is disposed on a same plane, and the aerial anchor node is disposed at a predetermined height above or below the same plane.

13. The localization method of claim 10, further comprising transmitting a request to adjust at least one of the dynamically adjustable height and the dynamically adjustable position of the unmanned robot based on a line-of-sight between the autonomous robot and the aerial anchor node.

14. The localization method of claim 13, further comprising receiving an updated ranging measurement from the aerial anchor node after at least one of the dynamically adjustable height and the dynamically adjustable position of the unmanned robot have been adjusted, and determining the location of the autonomous robot based thereon.

15. The localization method of claim 10, wherein the determining of the location of the unmanned robot carrying the aerial anchor node is based on a geometric dilution of precision (GDOP) calculated from respective locations of the plurality of fixed anchor nodes and a planned travel path of the autonomous robot.

16. The localization method of claim 10, wherein the ranging measurements comprise ultra-wide band (UWB) signals.

17. The localization method of claim 10, wherein the autonomous robot comprises a first unmanned autonomous vehicle and the unmanned robot comprises a second unmanned autonomous vehicle.

18. The localization method of claim 10, further comprising receiving a second additional ranging measurement from a second aerial anchor node attached to a second unmanned robot having a dynamically adjustable position and a dynamically adjustable height, and wherein the location of the autonomous robot is further determined based on the second additional ranging measurement received from the second aerial anchor node.

19. A non-transitory computer readable medium having instructions stored therein, wherein the instructions, when executed by a processor, cause the processor to perform a localization method to localize an autonomous robot for monitoring an asset, the localization method comprising:
receiving ranging measurements from a plurality of fixed anchor nodes that each have a fixed position and a fixed height with respect to the asset;
receiving an additional ranging measurement from an aerial anchor node attached to an unmanned robot having a dynamically adjustable position and a dynamically adjustable height different than the fixed position and the fixed height of each of the plurality of fixed anchor nodes; and
determining a location of the autonomous robot with respect to the asset based on the ranging measurements received from the plurality of fixed anchor nodes and the additional ranging measurement received from the aerial anchor node, and moving the autonomous robot about the asset based on the location of the autonomous robot.

20. The non-transitory computer readable medium of claim 19, wherein the plurality of fixed anchor nodes comprises three anchor nodes, wherein each of the three anchor nodes is positioned ata different fixed position around the asset.

* * * * *